United States Patent
Ishikawa et al.

(10) Patent No.: US 7,720,285 B2
(45) Date of Patent: May 18, 2010

(54) HEAD DETECTING APPARATUS, HEAD DETECTING METHOD, AND HEAD DETECTING PROGRAM

(75) Inventors: Hiroshi Ishikawa, Shizuoka (JP); Junji Maeda, Tokyo (JP); Hiroki Nakano, Otsu (JP)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 12/212,954

(22) Filed: Sep. 18, 2008

(65) Prior Publication Data

US 2009/0022398 A1 Jan. 22, 2009

Related U.S. Application Data

(63) Continuation of application No. 11/640,473, filed on Dec. 15, 2006, now Pat. No. 7,450,737.

(30) Foreign Application Priority Data

Dec. 16, 2005 (JP) ............................. 2005-363851

(51) Int. Cl.
 G06K 9/34 (2006.01)
 H04N 9/74 (2006.01)
(52) U.S. Cl. .................. 382/173; 382/103; 348/586
(58) Field of Classification Search ................. 382/224, 382/232, 254, 260, 274, 276, 305, 287–288, 382/291–299; 348/169, 239, 586; 345/630
 See application file for complete search history.

(56) References Cited

U.S. PATENT DOCUMENTS

| | | | |
|---|---|---|---|
| 6,184,926 B1 * | 2/2001 | Khosravi et al. | 348/239 |
| 6,400,374 B2 * | 6/2002 | Lanier | 345/630 |
| 6,567,116 B1 * | 5/2003 | Aman et al. | 348/169 |
| 6,674,485 B2 * | 1/2004 | Akiyama et al. | 348/586 |
| 7,103,211 B1 * | 9/2006 | Medioni et al. | 382/154 |
| 7,310,442 B2 * | 12/2007 | Monachino et al. | 382/156 |

* cited by examiner

*Primary Examiner*—Seyed Azarian
(74) *Attorney, Agent, or Firm*—Kenneth R. Corsello; Anne VAchon Dougherty

(57) ABSTRACT

A head detecting apparatus, including a foreground extraction section for extracting a foreground region in which a person is captured from an input image; a first main axis computing section which includes a first moment computing section for computing a moment around a center of gravity of the foreground region and calculating a main axis of the foreground region based on the moment around the center of gravity of the foreground region; a head computing section for computing a head region included in the foreground region as a part thereof based on the main axis of the foreground region and a shape of the foreground region; and an ellipse determining section for determining an ellipse to be applied to a person's head based on a shape of the head region.

9 Claims, 16 Drawing Sheets

HEAD DETECTING APPARATUS, HEAD DETECTING METHOD, AND HEAD DETECTING PROGRAM

CROSS REFERENCE TO RELATED APPLICATIONS

The present application is a Continuation of parent application, U.S. Ser. No. 11/640,473, filed Dec. 15, 2006.

BACKGROUND OF THE INVENTION

The present invention relates to a head detecting apparatus, a head detecting method, and a head detecting program. In particular, the present invention relates to a head detecting apparatus, a head detecting method, and a head detecting program which applies an ellipse to the head of person in an input image. With evolution of an image capturing apparatus and development of an image processing technique in recent years, it is desirable to automatically analyze and utilize moving images. There is a possibility that in techniques analyzing moving images, estimation of motion of an image-captured person is useful in many application fields such as a monitoring camera, a robot vision, or the like where human beings are involved. When estimating motion of a person, the movement of a head of a person including a face is extremely important information. Techniques for estimating motion of the head of a person by recognizing the head through analysis of a moving image are disclosed in some prior work as further detailed below.

A method for recognizing the head of moving object considered to be a person in a moving image by detecting a waist portion (i.e., concave portion) of the outline of the head has been proposed (for example, Y. Tian, et al., "Absolute Head Pose Estimation from Overhead Wide-Angle Cameras," Proceedings of the IEEE International Workshop on Analysis and Modeling of Faces and Gestures (AMFG '03), pp. 92-99, 2003). Also, methods for recognizing the head by matching a shape, and the like, have been proposed (for example, refer to Patent Document Japanese Unexamined Patent Publication (Kokai) No. 2002-157596 which discloses a method for performing real-time tracking of a face based on color distributions included in detected face patterns, and applying moving changes for face detection. Patent Document 2, Japanese Unexamined Patent Publication (Kokai) No. 2002-203239, discloses an algorithm for identifying a potential face based on detected face characteristics (eye, eyebrow, nose, and mouth). Patent Document 3, Japanese Unexamined Patent Publication No. 2002-203239 discloses face detection equipment including face similarity calculation means for computing similarity of face-likeness by comparison with face information stored in a storage section.

Also, Patent Document 4, Japanese Unexamined Patent Publication (Kokai) No. 2004-178229, discloses a man existence location detector which includes a segment-like vote section, which is a vote template modeling the shape of person's head and used to widen the detection range. Patent Document 5, Japanese Unexamined Patent Publication (Kokai) No. 2004-206656, discloses a detection device for stochastically calculating human body likeness by using the probability of a body part candidate's part-likeness, and the interrelation between parts. Patent Document 6, Japanese Unexamined Patent Publication (Kokai) No. 2004-53324, discloses a collision safety controller for automobiles which extracts a passenger's head based on a profile configuration of the passenger's head.

Patent Document 7, 8, 9, 10, 11, 12, 13, and 14, Japanese Unexamined Patent Publication (Kokai) No. H10-274516, Japanese Unexamined Patent Publication (Kokai) No. 2001-216518, Japanese Unexamined Patent Publication (Kokai) No. 2001-243466, Japanese Unexamined Patent Publication (Kokai) No. 2003-141541, Japanese Unexamined Patent Publication (Kokai) No. 2004-78778, Japanese Unexamined Patent Publication (Kokai) No. 2005-18654, Japanese Unexamined Patent Publication (Kokai) No. 2004-272933, Japanese Unexamined Patent Publication (Kokai) No. 2001-291108, respectively, disclose techniques for estimating motion of a head under the condition that a head or a face can be extracted. Patent Document 7 discloses a device for detecting the sense of face by detecting the center position of a face region akin to an ellipse, created by extracting description regions such as an eye, a nose, a mouth and the like.

Patent Documents 8 and 9 disclose devices which perform matching to templates of face images with different directions. Patent Document 10 discloses a device simultaneously displaying information regarding a face image at the time of registration and information regarding a face image being input at the time of recognition. Patent Document 11 discloses a driver monitoring device including determination means for determining the sense of the face based on the differences between images collected serially.

Patent Document 12 discloses a device for detecting a looking-aside condition by detecting optical flow. Patent Document 13 discloses a device for determining which sense of face matches most closely to the face in a monitor image, by preparing face images, such as a transverse-plane face, a leftward face, and a rightward face and by using canonical discriminant analysis. Patent Document 14 discloses an image processing device having database creation means storing average face images which are made from three-dimensional average face models and which correspond to various angles.

The method described in Non-patent Document 1 has a problem such that recognition of the head is difficult when accuracy of the extracted moving object is reduced because of the characteristics of the image or the background, since a waisted portion of the outline was not detected. For example, if the background includes colorful and complicated texture, since the outline of the moving object is not smooth but has lots of dents, it is difficult to determine the correct waisted portion of the outline by using this method. Also, for example, in the case in which both hands are put on the head, or in the case in which a person is wearing high collared clothes, dents appear in places other than the intended place, it is difficult to determine the correct waisted portion of the outline by using this method.

In the methods disclosed in Patent Document 1, 2, and 3, it takes a long time to match since there are many parameters. Also, in these methods, it is not possible to obtain stable matching results when the outline is not smooth. Also, in the methods disclosed in Patent Document 4, 5, and 6, it is difficult to recognize the head of a person when the outline is not smooth.

The devices disclosed in Patent Document 7, 8, 9, 10, and 11 are not capable of detecting motion of a head, in the case in which it is difficult to recognize each part of a face due to low resolution of the image, in the case in which a person's face is turned away from the image pick-up side of a camera by more than 90 degree, and the like.

With regard to the device for detecting optical flow described in Patent Document 12, it is possible to compute this when the moving image is obtained under good conditions, such as using an in-vehicle camera, however, it is not possible to compute this when the face is small, when characteristic parts such as eyes, a nose, and the like, cannot be extracted as the person is facing obliquely away from the image pick-up side, or when the background is colorful and its texture is complex, and the like.

In the devices disclosed in Patent Document 13 and 14, a problem about what angle of the interval the data should have arises when the data is prepared. When the interval of the angle is small, matching takes a long time, and when the angle of the interval is large, the accuracy of detection deteriorates. Also, incorrect detection occurs due to the difference between a prepared face image and an input face image. Furthermore, the matching accuracy also deteriorates when a person is wearing glasses, a hat, and the like. Furthermore, the matching accuracy with the prepared date deteriorates when the extracted moving object is rough due to the characteristics of the image and the background.

As described above, in the conventional techniques, accuracy of recognition of a head and estimation of motion of a head are not good if the contour is not smooth due to the deteriorated accuracy of extracting a person's image. For example, in the conventional techniques, under the condition in which a monitoring camera is installed in the store of retailer, the outline of a person can not be extracted since the background (shelves for goods) is colorful and its texture is complex.

It is therefore an object of the present invention to provide a head detecting device, a head detecting method, and a head detecting program which can solve the above-mentioned problems. The object is achieved by the combinations of characteristics of independent claims in the scope of claims. Dependent claims also regulate advantageous specific examples of the present invention.

The present invention provides a head detecting apparatus including a foreground extraction section for extracting a foreground region in which a person is captured, from an input image, a first main axis computing section for computing a main axis of the foreground region, a head computing section for computing a head region included in the foreground region as a part thereof based on the main axis of the foreground region and a shape of the foreground region, and an ellipse determining section for determining an ellipse to be applied to a person's head in the input image based on a shape of the head region; a head detecting method using the head detecting apparatus, and a head detecting program to cause a computer to function as the head detecting apparatus.

The concept of the present invention is not the enumeration of all the necessary characteristics of the present invention, but subcombinations of the characteristics thereof may be also accepted as the invention.

According to the present invention, an ellipse can be appropriately applied to a person's head regardless of the accuracy of an extracted foreground region.

DETAILED DESCRIPTION OF THE INVENTION

Hereinafter, the present invention is described through an embodiment of the present invention. The embodiment described below does not limit the scope of claims, nor may all the combinations of the characteristics described in the embodiment always be necessary as means for solving problems of the present invention.

Figure 1:
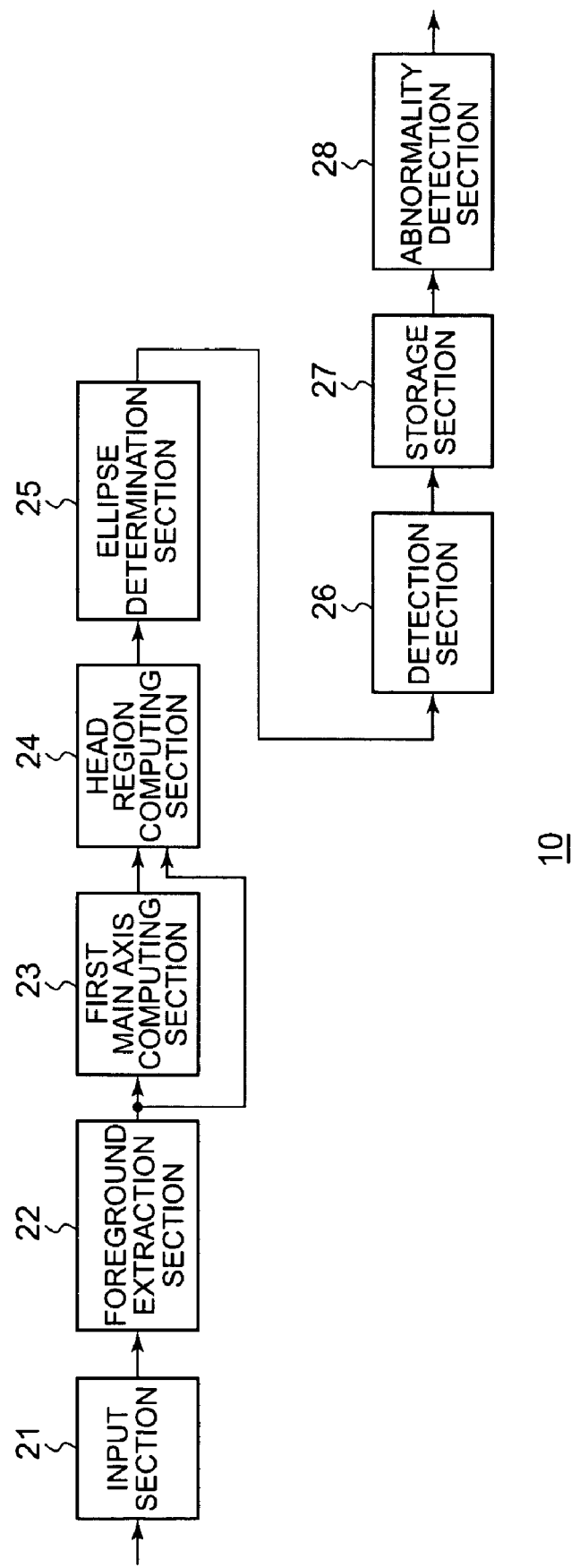
FIG. 1 shows a configuration of a monitoring system 10 according to the present embodiment.

FIG. 1 shows a configuration of a monitoring system 10 according to this embodiment of the present invention. The monitoring system 10 includes an input section 21, a foreground extraction section 22, a first main axis computing section 23, a head region computing section 24, an ellipse determining section 25, a detection section 26, a storage section 27, and an abnormality detection section 28. The monitoring system 10 extracts an image of a person included in an input image taken by a video camera, or the like, applies an ellipse to the head, and estimates motion of the head based on the motion of the applied ellipse. The monitoring system 10 can appropriately estimate the motion of the head by applying the ellipse appropriately to the head even if accuracy of the extracted image of the person is not good. Furthermore, the monitoring system 10 can appropriately estimate the motion of the head by using a flesh color region inside the ellipse.

The input section 21 inputs a plurality of frame images which constitutes a moving image, as a plurality of input images. For example, the input section 21 inputs a plurality of frame images which constitutes a moving image taken by a video camera installed in a store. The foreground extraction section 22 extracts a foreground region including an image of a person taken, from the input images input to the input section 21.

The first main axis computing section 23 calculates a main axis of the foreground region extracted by the foreground extraction section 22. For example, the first main axis computing section 23 can calculate an axis which passes through the center of gravity of the foreground region and extends in the direction of the head, as the main axis. The head region computing section 24 calculates a head region included in the foreground region as a part thereof, based on the main axis of the foreground region and the shape of the foreground region calculated by the first main axis computing section 23. For example, the head region computing section 24 may calculate a circle roughly including a part which can be estimated to be a head, based on the main axis of the foreground region and the outline of the foreground region, and then calculates a part of the foreground region included in the circle as the head region. The ellipse determining section 25 determines an ellipse to be applied to the person's head based on the shape of the head region calculated by the head computing section 24.

The detection section 26 detects, from a plurality of the frame images, the position of the person's head and the change of the orientation of the head, based on the change of the ellipse determined by the ellipse determining section 25, according to a plurality of frame images. For example, the detection section 26 may determine the position of the person's head and the change of the orientation of the head, based on the change of the center position of the ellipse in the frames determined by the ellipse determining section 25, the change of the size of the ellipse, the change of the angle of the main axis (long axis) of the ellipse, the change of the ratio of the long axis to the short axis of the ellipse, and the like. Also, the detection section 26 may detect the amount of rotation of the person's head based on the change of at least one of the area and the distribution of the flesh color region in the ellipse determined according to a plurality of frame images.

Furthermore, the detection section 26 may calculate the change of the position of the head and the orientation of the head by using the position and the size of other regions (torso, and the like) calculated from the foreground region, in addition to the information regarding the ellipse. Also, when the amount of change of the ellipse is larger than a predetermined amount, the detection section 26 may determine the amount of the change as a detection error. The detection section 26 can prevent serial errors in detection by calculating the change of ellipse without using the value of the previous and next frames, in every few frames.

The storage section 27 stores the history of the position of the person's head and the change of orientation of the head detected by the detection section 26 for each of a plurality of persons. The abnormality detection section 28 detects abnormality of a person's actions when the difference between the amount of change of the position and the orientation of one person's head based on the history of change stored in the storage section 27 and a reference amount of change based on the position of the other person's heads and the change thereof stored in the storage section 27 is equal to or larger than a predetermined amount. For example, since a suspicious person tends to frequently move the head or turns the head up in the store, worrying about a monitor camera or other people, which differs from the head motions of the other general customers, the abnormality detection section 28 can detect such abnormal motions of the head.

Since the monitoring system 10 calculates the head region including the head based on the main axis of the foreground region, and determines the ellipse based on the shape of the head region, the ellipse can be applied appropriately without being affected by the accuracy of the extracted foreground region. Therefore, the monitoring system 10 can apply the ellipse even under bad conditions such that the foreground and the background can not be separated smoothly. Furthermore, since the monitoring system 10 can appropriately apply the ellipse, the motion of the head can be estimated appropriately.

Figure 2:
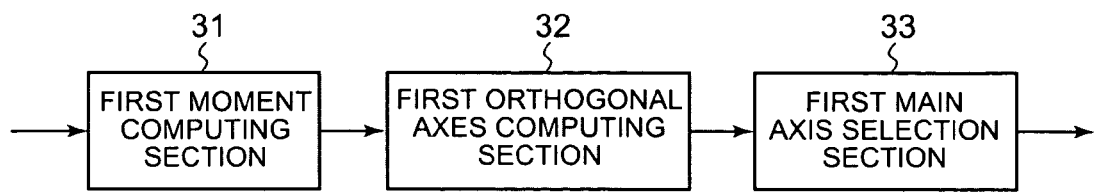
FIG. 2 shows an example of a configuration of a first main axis computing section 23 according to the present embodiment.

FIG. 2 is an example of the configuration of the first main axis computing section 23 according to the present embodiment. For example, the first main axis computing section 23 may have a first moment computing section 31, a first orthogonal axes computing section 32, and a first main axis selection section 33. The first moment computing section 31 calculates the moment around the center of gravity of the foreground region. The first orthogonal axes computing section 32 calculates two orthogonal axes in the foreground region based on the moment around the center of gravity of the foreground region. The first main axis selection section 33 selects one axis in the two orthogonal axes calculated by the first orthogonal axes computing section 32, which forms smaller angle with the main axis of the foreground region calculated in at least one of the previous or next frame images, as the main axis of the foreground region. Since the first main axis computing section 23 calculates the main axis based on the moment around the center of gravity of the foreground region, the first main axis computing section 23 can set the center line of the foreground region as the main axis. Therefore, the first main axis computing section 23 can securely set the axis which extends from the center of gravity to the head as the main axis.

Figure 3:
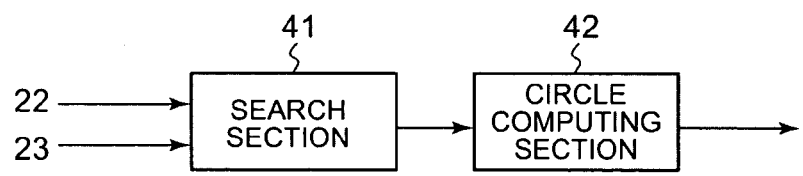
FIG. 3 shows an example of a configuration of a head computing section 24 according to the present embodiment.

FIG. 3 shows an example of the configuration of the head computing section 24 according to the present embodiment. For example, the head computing section 24 may include a search section 41 and a circle computing section 42. The search section 41 searches a top point of a head of a person, by setting a starting point at one of intersecting points of the outline of the foreground region and the main axis cross, which is deemed to be at a higher position in the image pick-up target space, and following pixels of the outline in the foreground region. The circle computing section 42 calculates a circle, in which the proportion of pixels of the foreground region included in the circle is equal to or greater than a predetermined reference proportion, as a circle surrounding the head, among circles which have centers on a line connecting the top point and the center of gravity of the foreground region and pass through the top point of the head.

The head computing section 24 determines the foreground region included in the circle surrounding the head calculated by the circle computing section 42 as the head region. Thereby, the head computing section 24 can extract a part which is reliably estimated to be a part including a person's head as the head region. Also, the head computing section 24 further searches the top point of the head, starting from an initial top point of the head and following the outline, and therefore, for example, even in the case in which the orientation of the body and the orientation of the head have a different inclination (for example, when the person is looking at the ground or turning the face up), the head region can be appropriately extracted.

Figure 4:
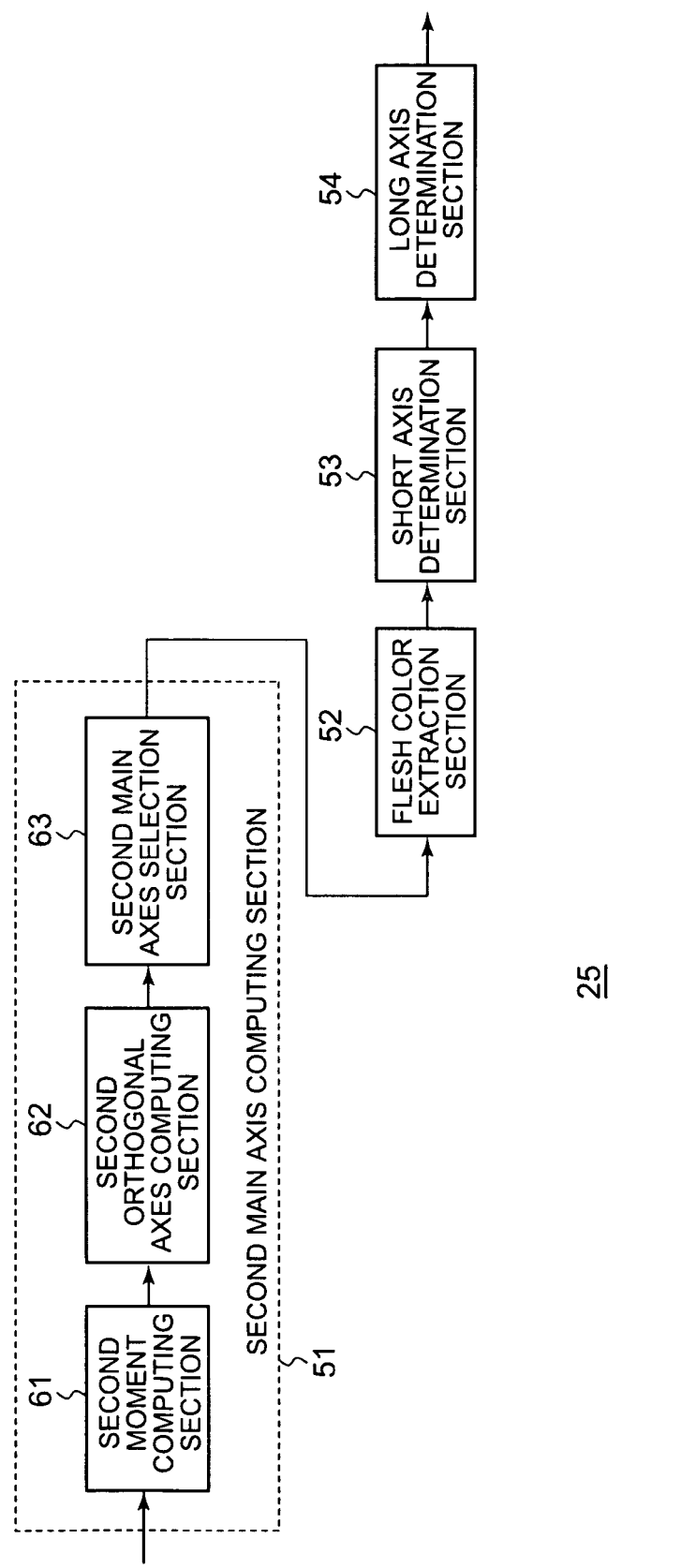
FIG. 4 shows an example of a configuration of an ellipse determining section 25 according to the present embodiment.

FIG. 4 shows an example of the configuration of the ellipse determining section 25 according to the present embodiment. For example, the ellipse determining section 25 may include a second main axis computing section 51, a flesh color extraction section 52, a short axis determination section 53, and a long axis determination section 54. The second main axis computing section 51 calculates the main axis of the head region. The ellipse determining section 25 determines the main axis calculated by the second main axis computing section 51 as the long axis of the ellipse. The second main axis computing section 51 may calculate the main axis of the head region by using the same method as the method for calculating the main axis of the foreground region by the first main axis computing section 23.

For example, the second main axis computing section 51 may include a second moment computing section 61, a second orthogonal axes computing section 62, and a second main axis selection section 63. The second moment computing section 61 calculates the moment around the center of gravity of the head region. The second orthogonal axes computing section 62 calculates two orthogonal axes in the head region based on the moment around the center of gravity of the head region. The second main axis selection section 63 selects the axis which has a smaller angle with the main axis of the foreground region as the main axis of the head region, in the two orthogonal axes. The second main axis computing section 51 can thereby calculate the main axis of the head region (the long axis of the ellipse).

The flesh color extraction section 52 extracts the biggest flesh color region in the head region. The short axis determination section 53 determines the length of the short axis of the ellipse according to the longest distance between the main axis of the head region and the pixels of the flesh color region extracted by the flesh color extraction section 52. The short axis determination section 53 calculates the distance between each pixel in the flesh color region and the main axis, and decides the longest distance out of the calculated distance as the short axis of the ellipse. The flesh color extraction section 52 can thereby form the short axis of the ellipse which matches the face. Also, the short axis determination section 53 can alternately determine the length of the short axis of the ellipse according to the longest distance between the main axis of the head region and the pixels of the flesh color region. Thereby, for example, even if the person turns his/her back to the camera, it is possible to determine the short axis of the ellipse. The long axis determination section 54 sets the length of the long axis of the ellipse by multiplying the length of the short axis of the ellipse determined by the short axis determination section by a predetermined value which is larger than 1. Incidentally, the flesh color extraction section 52 may detect the flesh color region based on color images, or may detect the flesh color region based on the contrast between the head and face in grayscale images.

According to the above-described ellipse determining section 25, since the long axis of the ellipse is determined as the main axis of the head region, even the accuracy of the extracted foreground region is poor, the impact on the ellipse to be applied is minimal. Therefore, the ellipse determining section 25 can appropriately apply the ellipse to the person's head.

Figure 5:
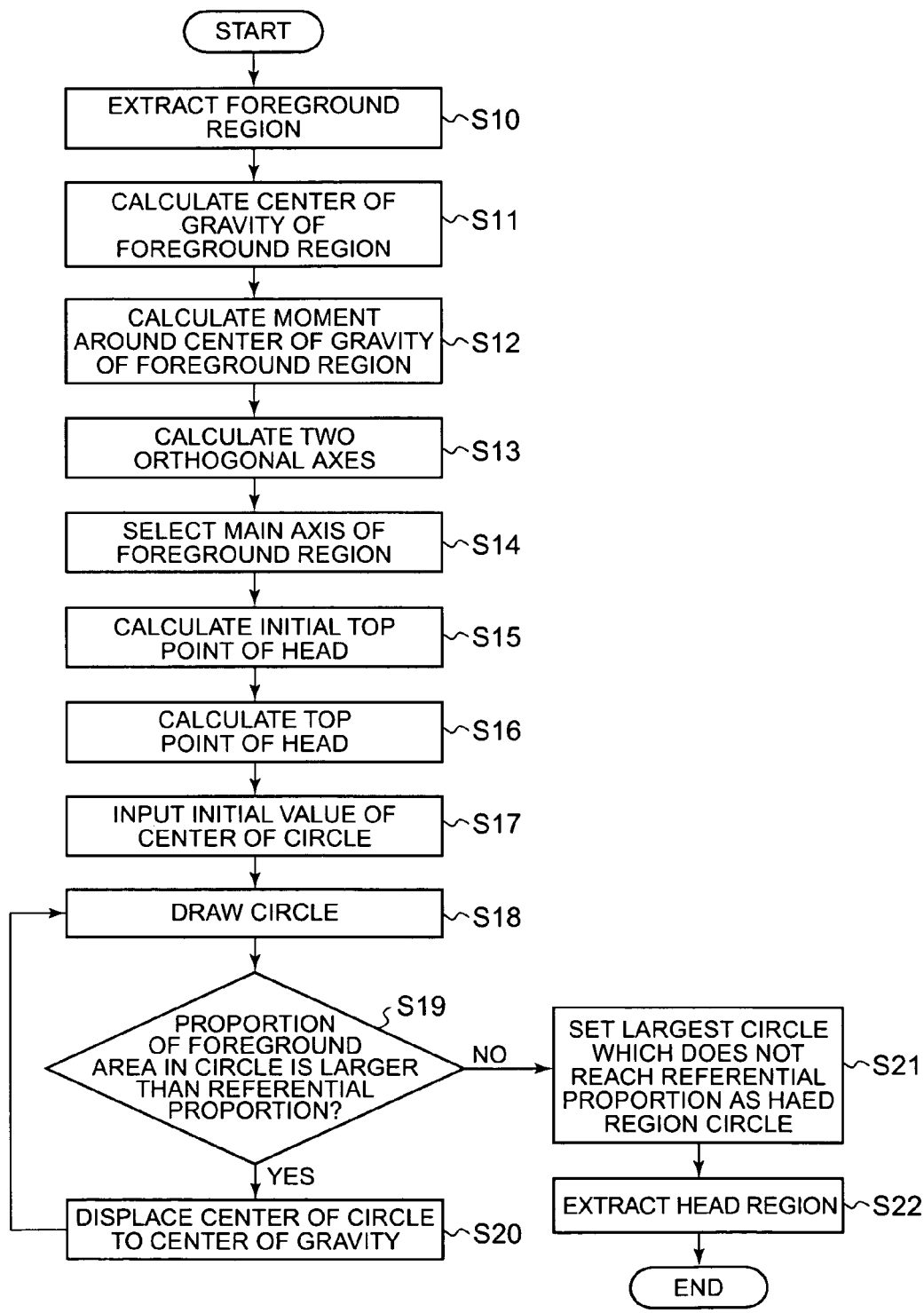
FIG. 5 shows an example of a flowchart of a process for extracting a head region from a foreground region by the monitoring system 10 according to the present embodiment.

FIG. 5 shows an example of a flowchart of a process for extracting the head region from the foreground region by the monitoring system 10 according to the present embodiment. First, the foreground extraction section 22 extracts the foreground region in which a person is pictured, from the input image in step S10. For example, the foreground extraction section 22 may compare the background image captured in the case in which a person does not exist in the frame, with an input image, and extract the unmatched portion as a foreground region. Also, the foreground extraction section 22 may extract an object which is moving between frames as the foreground region.

Next, the first main axis extraction section 23 calculates the main axis of the foreground region. For example, the first main axis computing section 23 may calculate the main axis of the foreground region by using characteristics of the moment, as described in step S11 to step S13 below.

In step S11, the first moment computing section 31 calculates the coordinates of the center of gravity of the extracted foreground region. For example, the first moment computing section 31 calculates the coordinates of the center of gravity of the foreground region by calculating the average coordinate values of the pixels belonging to the foreground region. The first moment computing section 31 may calculate the coordinate of the center of gravity based on the average of the distance (deference between coordinates) between a predetermined pixel and each pixel belonging to the foreground image. In step S12, the first moment computing section 31 calculates a moment $M_{pq}$ by using the formula 1 below.

[Formula 1]

$$M_{pq} = \sum_i \sum_j (i - i_g)^p (j - j_g)^q f_{ij} \tag{1}$$

In the formula 1, p and q denote the order of the moment, $f_{ij}$ denotes a binary image expressing the foreground region (an image in which the value for the pixels inside the foreground region is 1, the value for the pixels outside the foreground region is 0), and $(i_g, j_g)$ denotes the coordinate of the center of gravity. In this instance, the coordinate of a pixel is expressed as (i, j), and i denotes the position of pixels in the horizontal direction, wherein the right side is positive, and j denotes the position of pixels in the vertical direction, wherein the lower side is positive.

Subsequently, in step S13, the first orthogonal axes computing section 32 calculates the two orthogonal axes crossing at the center of gravity (the first axis and the second axis) based on the moment $M_{pq}$ around the center of gravity calculated by the formula 1. The first orthogonal axes computing section 32 calculates the angle θ formed by the first axis with the axis i, by using the formula 2.

[Formula 2]

$$\theta = \frac{1}{2} \tan^{-1} \frac{2M_{11}}{M_{20} - M_{02}} \tag{2}$$

That is, the first orthogonal axes computing section 32 calculates the two axes by using three second order moments $M_{11}$, $M_{20}$ and $M_{02}$ as shown in the formula 2. However, in the case when $M_{20} = M_{02}$, the first orthogonal computing section 32 calculates the angle θ of one of the two axes by using the formula 3 below.

[Formula 3]

$$\theta = \begin{cases} \frac{1}{4}\pi (M_{11} > 0) \\ 0 (M_{11} = 0) \\ -\frac{1}{4}\pi (M_{11} < 0) \end{cases} \tag{3}$$

The first orthogonal axes computing section 32 sets a straight line of which the angle with the i-axis is θ, and which passes through the coordinates of the center of gravity of the foreground region $(i_g, j_g)$, as the first axis. In this instance, θ is the value equal to or larger than −π/4, and equal to or smaller than π/4. Subsequently, the first orthogonal axes computing section 32 sets a line which is orthogonal to the first axis, and which passes through the coordinates of the center of gravity $(i_g, j_g)$, as the second axis.

Subsequently, in step S14, the first main axis selection section 33 selects one of the first axis and the second axis which are orthogonal to each other, as the main axis of the foreground region. The first main axis selection section 33 may use a method for selecting the axis having the greater length included in the foreground region as the main axis; a method for selecting the axis forming the smaller angle with the main axis in the previous frame or the next frame (or the both frames) as the main axis; a method for selecting the axis which is closer to the vertical line when a person first appears in an image plane as the main axis since the object is a human being; or a method for selecting the main axis by combining these methods with weights.

As described in steps S11 to S14, the first main axis computing section 23 calculates the main axis of the foreground region by using the moment $M_{pq}$ around the center of gravity and the coordinate of the center of gravity which can be stably detected even if the outline of the foreground region is inaccurate. Thereby, even if the accuracy of the extracted foreground region is poor, the first main axis computing section 23 can reduce the impact on the ellipse to be applied.

In step S15, the search section 41 calculates one of intersecting points of the outline of the foreground region and the main axis, which is deemed to be at the highest position in the actual 3-D space, as an initial top point. In this instance, the upper position in the picturing object space means the upper side in the pictured frame arranged in the actual space, regardless of the up-and-down in the frame.

Next, in step S16, the search section 41 searches the top point of the head of a person, by starting from the initial top point of the head as a starting point, and following the outline of the foreground region. For example, the search section 41 can follow the outline of the foreground region from the starting point in the direction away from the center of gravity of the foreground region, and set the furthest point from the center of gravity as the top point of the head. In this case, in order to absorb such a fact to some degree that the outline of the foreground region can not be extracted smoothly and the outline is jagged, the search section 41 tries to tolerate the jaggedness and continues searching if the reduction of the amount of distance from the center of gravity below the heretofore obtained maximum is smaller than a predetermined value during following the outline. Also, the search section 41 may determine the top point of the head under the condition that the angle formed by a line which connects the top point of the head and the center of gravity of the foreground region (hereinafter referred to as the center line) and the main axis of the foreground region is equal to or less than a predetermined reference angle. Incidentally, the head computing section 24 may skip step S16 and set the initial top point of the head as the top point of the head.

Next, in steps S18 to S21, the circle computing section 42 calculates the largest circle as a circle surrounding the head, within the range in which the proportion of pixels of the foreground region included in the circle is equal to or greater than a predetermined proportion of pixels, among circles having centers on the center line and passing through the top point.

For example, the circle computing section 42 draws a circle which passes through the top point of the head centered on a point on the center line which is minutely distant from the top point of the head. Subsequently, the circle computing section 42 determines whether or not the proportion of the foreground region included in the circle is equal to or larger than the reference proportion (S19). If the proportion is equal to or larger than the reference proportion (Yes in S19), the circle computing section 42 displaces the center position of the circle in the direction of the center of gravity (S20), and the process is returned to step S18. As the center is displaced in the direction of the center of gravity, the circles drawn by the circle computing section 42 are gradually enlarged, and the portions which do not belong to the foreground region increase. Subsequently, if the proportion of the foreground region included in the circle becomes smaller than the reference proportion, the circle computing section 42 sets the circle just before the circle in which proportion of the foreground region included in the circle becomes smaller than the reference proportion as a head area circle (S21).

Then, in step S22, the head computing section 24 extracts the foreground region which is surrounded by the head area circle calculated by the circle computing section 42 as a head region.

By gradually enlarging the circles up to the reference proportion from the top point of the head as described above, the head computing section 42 can include the whole head inside the head area circle. Incidentally, if the foreground region includes a flesh color region estimated to be a face, the circle computing section 42 may correct the circle surrounding the head, in which the proportion of pixels of the foreground region included inside the circle is calculated and reaches the predetermined reference proportion, to enlarge so that the circle can surround a whole flesh color region under the condition that the circle passes beside the flesh color region of the foreground region. Thereby, the circle computing section 42 can include the section estimated to be a face inside the head area circle. Also, the circle computing section 42 may correct the head area circle based on the size of the circle in the previous frame and the next frame.

Figure 6:
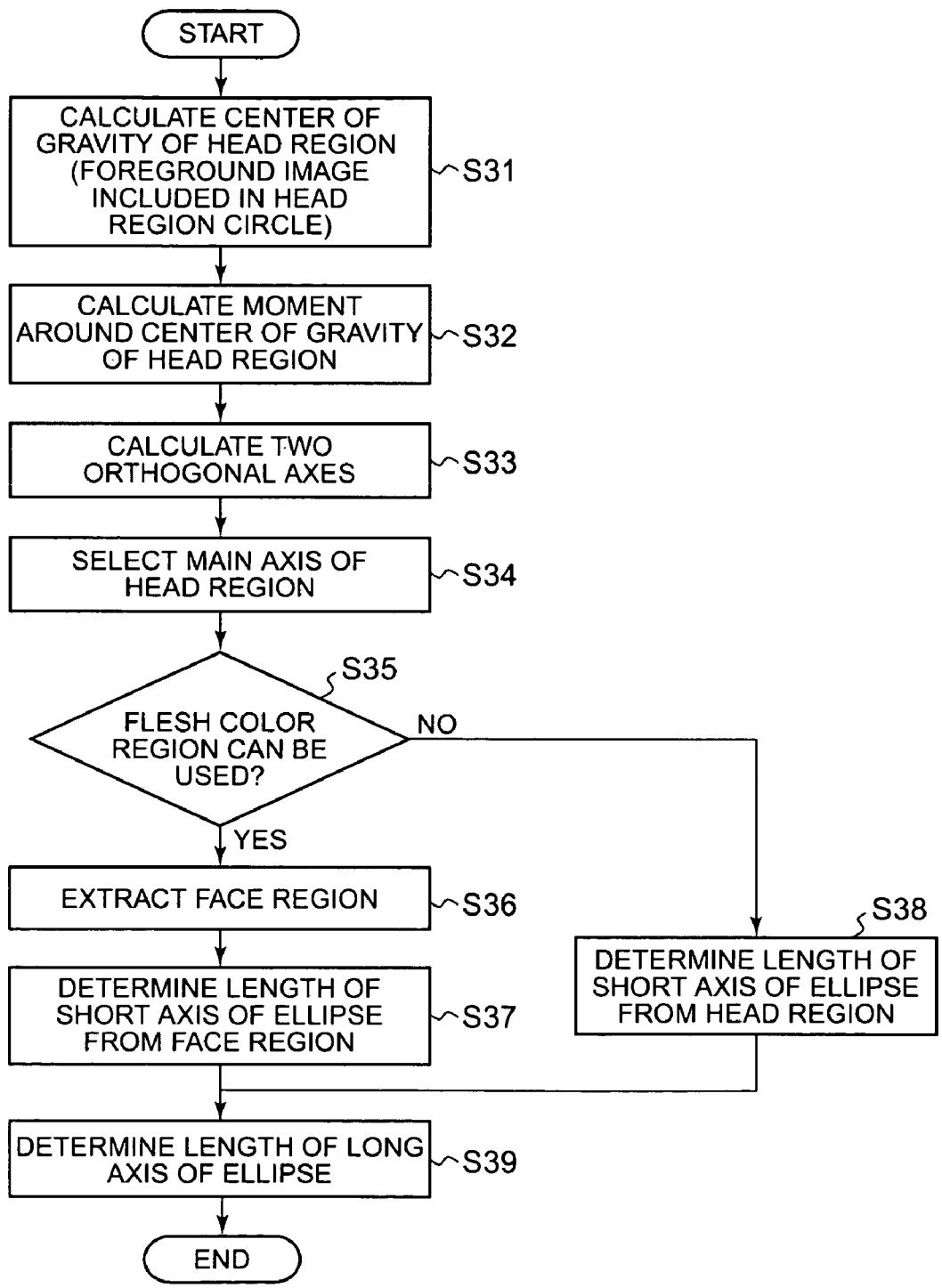
FIG. 6 shows an example of a flowchart of a process for determining an ellipse applied to a head by the ellipse determining section 25 according to the present embodiment.

FIG. 6 shows an example of a flowchart of a process for determining an ellipse applied to the head by the ellipse determining section 25 according to the present embodiment. Then, in step S31, the second moment computing section 61 calculates the center of gravity of the head region (the foreground region included in the head area circle). The center of gravity serves as the center of an ellipse applied to the head. Next, in step S32, the second moment computing section 61 calculates the moment around the center of gravity of the head region, for example, in the same manner as in step S12. Subsequently, in step S33, the second orthogonal axis computing section 62 calculates the two axes which are orthogonal in the center of gravity by using the moment around the center of gravity, for example, in the same manner as in step S13.

Next, in step S34, the second main axis selection section 63 selects one axis out of the two axes calculated in step S33 as the main axis of the head region. The selected main axis of the head region becomes the main axis (long axis) of the ellipse applied to the head. The second main axis selection section 63 may select the main axis of the head region in the same manner as in step S14. Furthermore, in addition to this, the second main axis selection section 63 may select the main axis of the head region which is closer in angle to the main axis of the foreground region. In the process up to step S34, the ellipse determining section 25 can determine some parameters of the ellipse, that is, the position (the center), the discrimination of the long axis and the short axis, and the inclination.

Next, in steps S35 to S38, the short axis determination section 53 determines the length of the short axis. First, the short axis determination section 53 determines whether or not a flesh color region can be used (S35). For example, if flesh color is included in the head region equal to or more than a predetermined proportion, the short axis determination section 53 determines that the flesho color region can be used.

If the flesh color region can be used (Yes in S35), the flesh color extraction section 52 extracts the biggest flesh color region in the head region as a face (S36). Subsequently, the short axis determination section determines the length of the short axis of the ellipse based on the face (S37). The short axis determination section 53 draws a perpendicular line from each pixel included in the face to the long axis of the ellipse, detects the length of each line, and sets the length twice as long as the longest line as the length of the short axis. If a person wears a low-cut shirt, or the like, the flesh color region tends to become longer than the actual size of face in the vertical direction, however, the flesh color region in the horizontal direction is almost the same as the actual size of the face. Therefore, by using the perpendicular line in the direction of the long axis of the ellipse from the face downward, the short axis determination section 53 can match the width of face and the length of the short axis to the actual size approximately.

If the flesh color region can not be used (No in S35), the short axis determination section 53 determines the length of the short axis of the ellipse based on the head region. For example, the short axis determination section 53 draws a perpendicular line from each pixel included in the head region to the long axis of the ellipse and detects the length of each line, and sets the length twice as long as the longest line as the length of the short axis.

Next, in step S39, the long axis determination section 54 determines the length of the long axis. For example, the long axis determination section 54 may set the length twice as long as the length from the center of the ellipse to the top point of the head as the length of the long axis, and also set the value obtained by multiplying the length of the short axis by a predetermined value which is larger than 1 as the length or long axis.

As described above, the ellipse determining section 25 can appropriately apply the ellipse to the head based on the shape of the head region, or the like. Incidentally, the short axis determination section 53 and the long axis determination section 54 determines the length of the short axis and the long axis of the ellipse by using information from the previous frame and the next frame. For example, if the value differs largely between the previous/next frame and the present frame, the short axis determination section 53 and the long axis determination section 54 may determine that the value for the present frame is an error, and set an average value of the previous and the next frame as the value for the present frame.

Figure 7:
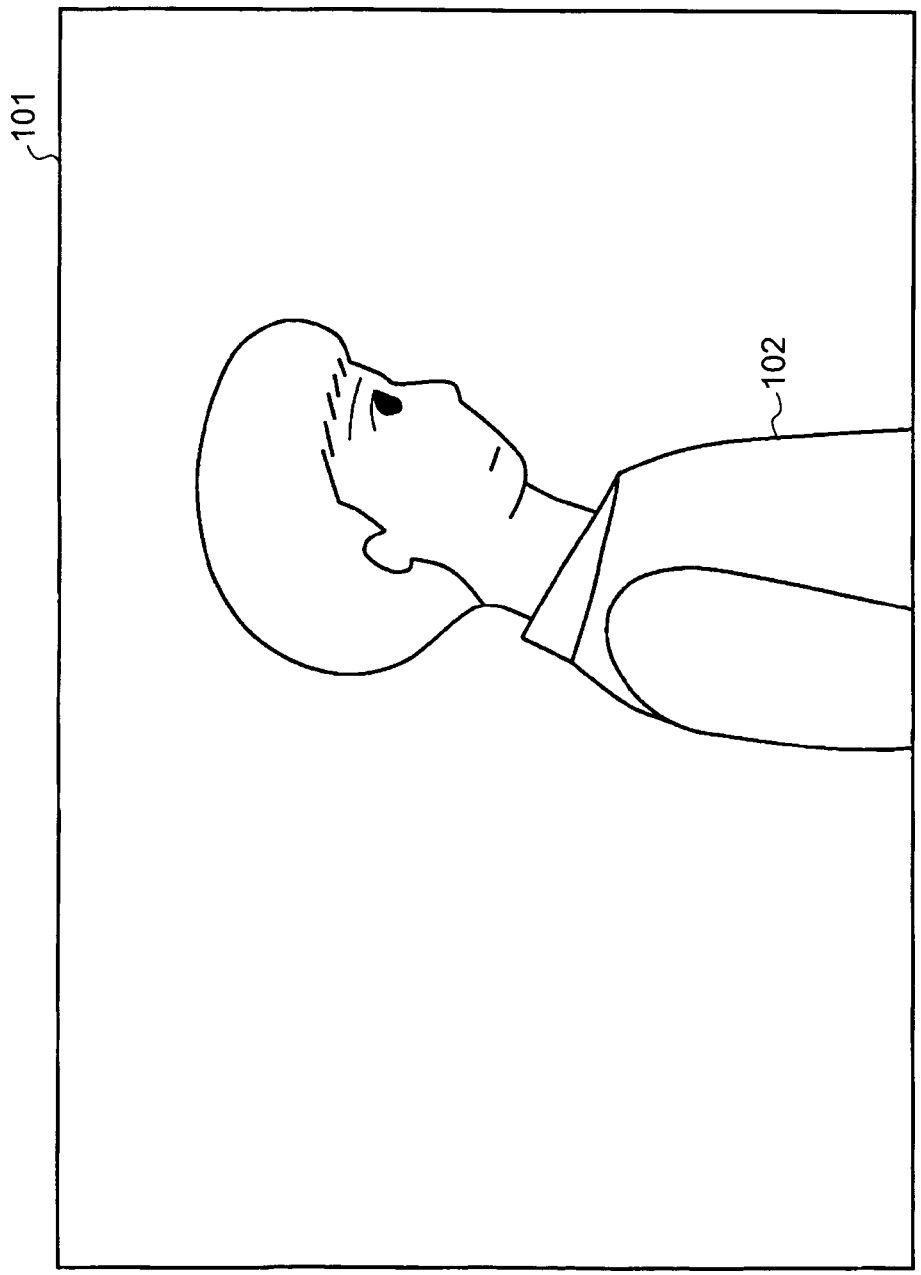
FIG. 7 shows an example of an input image 101.
Figure 8:
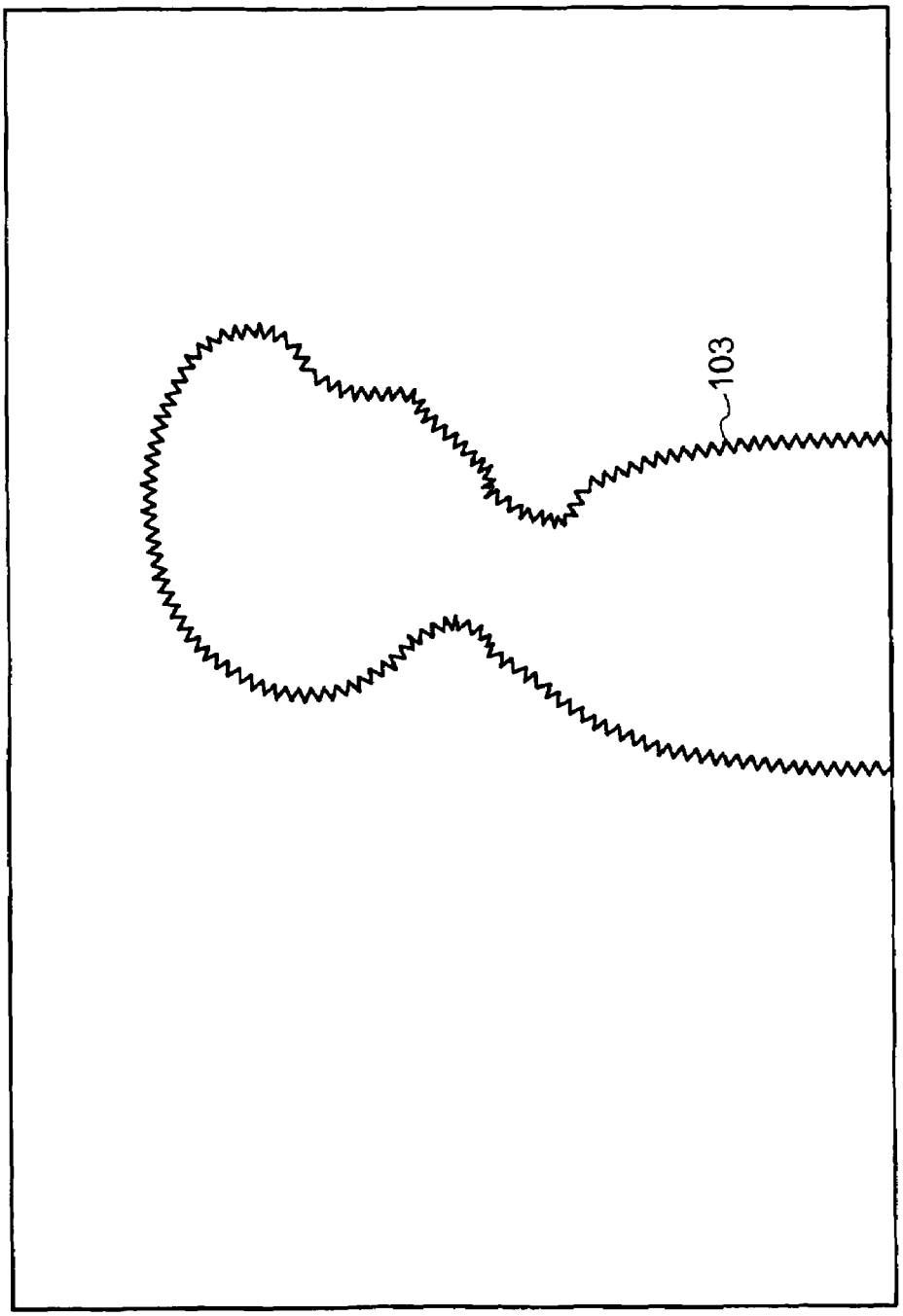
FIG. 8 shows an example of a foreground region 103 extracted from the input image 101.

FIG. 7 shows an example of an input image 101. FIG. 8 is an example of a foreground region 103 extracted from the input image 101. For example, the foreground extraction section 22 extracts an image of a person 102 from the input image 101 shown in FIG. 7. The foreground extraction section 22 thereby can extract the foreground region 103 cut out at the outline of the image of a person 102 shown in FIG. 8. In this instance, if the background image is colorful and its texture is complex, the foreground extraction section 22 can not extract the outline of the foreground region 103 smoothly (for example, the outline is jagged).

Figure 9:
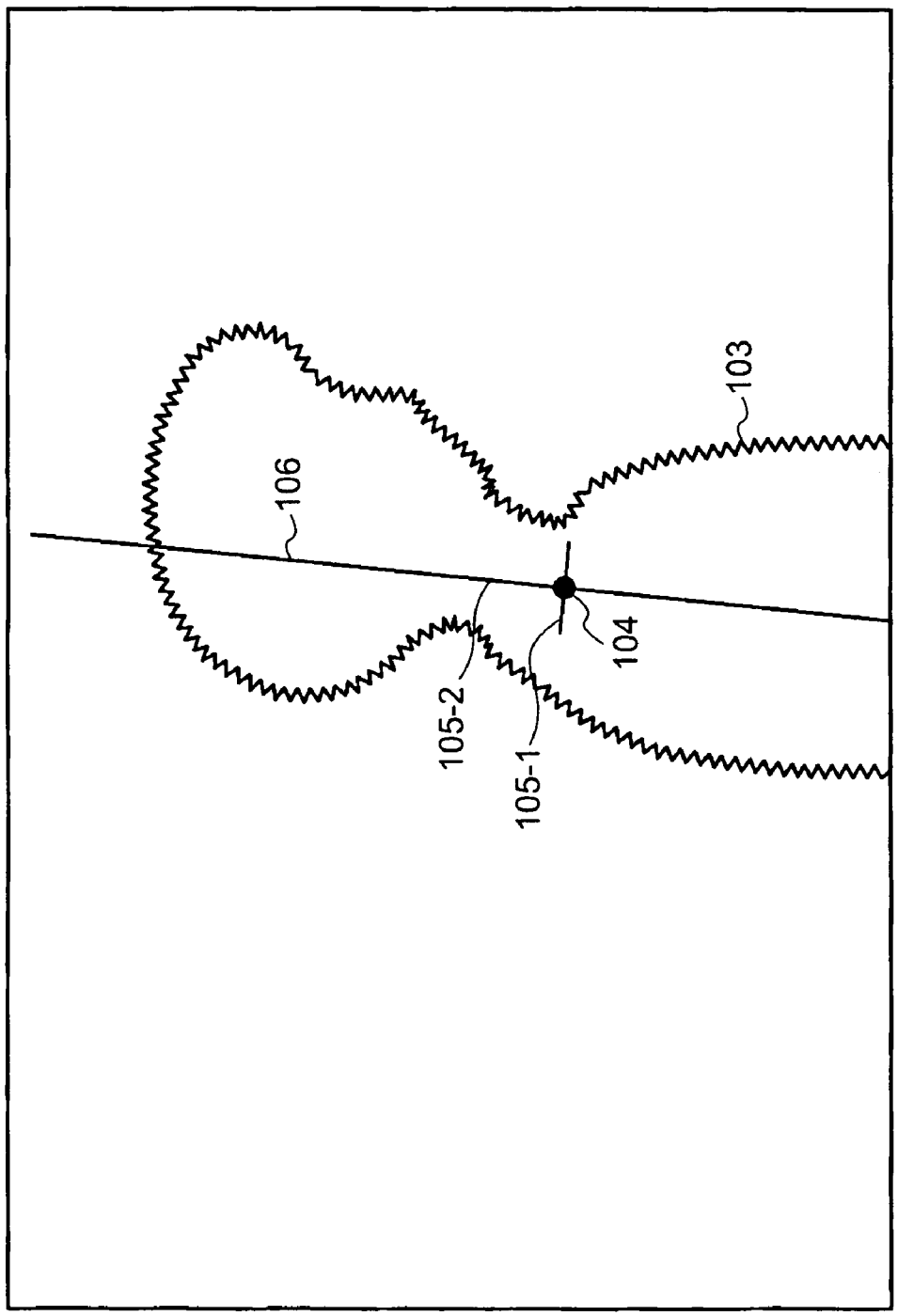
FIG. 9 shows an example of an main axis 106 calculated from the foreground region 103.

FIG. 9 shows an example of a main axis 106 calculated from the foreground region 103. The first main axis computing section 23 calculates the main axis 106 of the foreground region 103 shown in FIG. 8. For example, the first main axis computing section 23 calculates a center of gravity 104 of the foreground region 103, further calculates two orthogonal axes 105-1 and 105-2 from a moment around the center of gravity, and then sets one of the axes as a main axis 106. Even if the outline of the foreground region 103 is not smooth, it does not greatly affect the position of the center of gravity 104 and the moment around the center of gravity, and therefore the first main axis computing section 23 can calculate the main axis 106 stably and appropriately by using the center of gravity 104 and the moment around the center of gravity.

Figure 10:
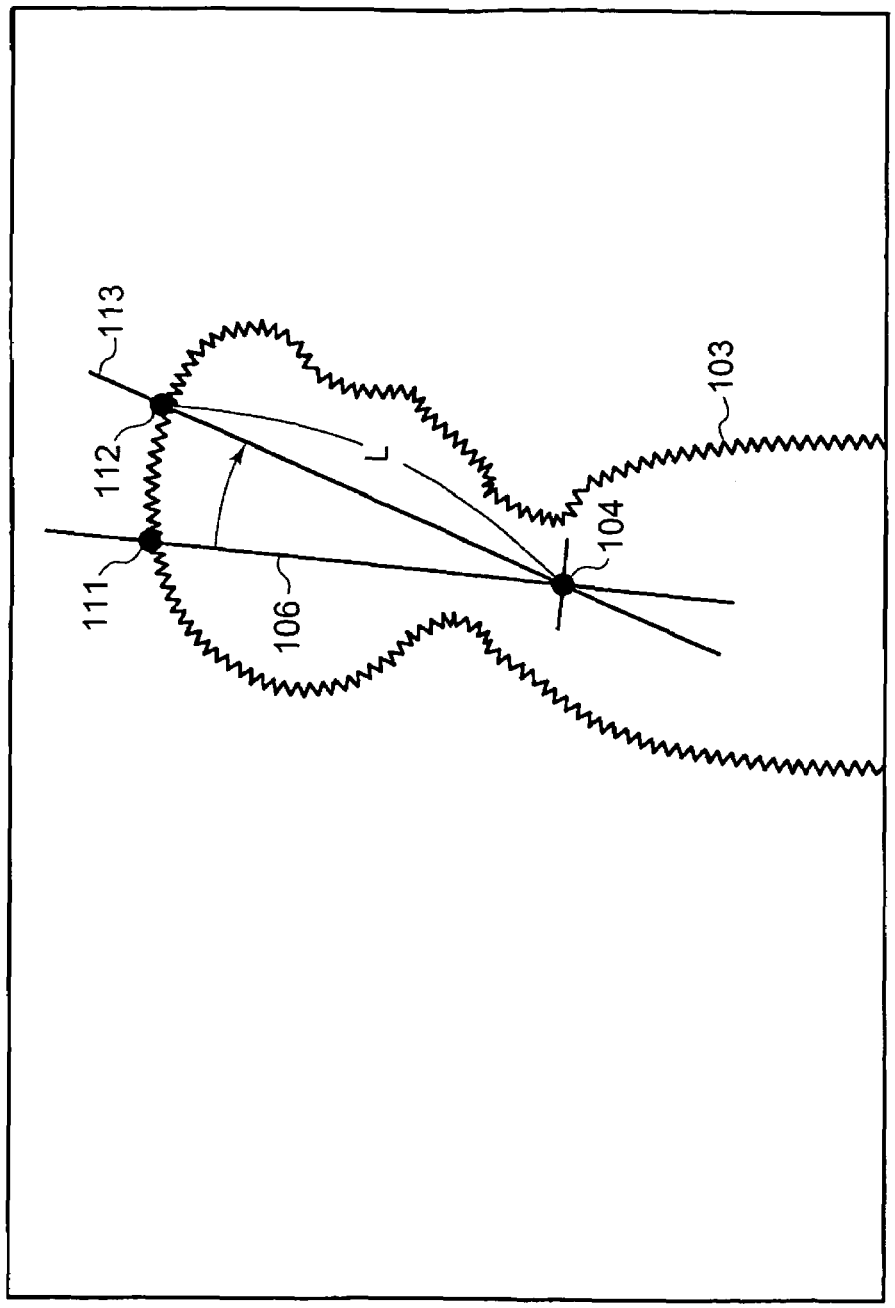
FIG. 10 shows an example of an initial top point of the head 111 and a top point of the head 112 searched from the main axis 106 of the foreground region 103.

FIG. 10 shows an example of an initial top point of the head 111 and a top point of the head 112 searched from the main axis 106 of the foreground region 103. The head computing section 24 calculates the point where the main axis 106 of the foreground region 103 and the outline of the foreground region 103 cross as the initial top point of the head 111. The head computing section 24 follows the outline of the foreground region 103 from the initial top point of the head 111, and sets the point in which the distance L from the center of gravity 104 is the largest as the top point of the head 112. In this instance, the straight line connecting the center of gravity 104 and the top point of the head 112 is the center line 113. By extracting the head region based on the top point of the head 112, the head computing section 24 can appropriately calculate the top point of the head 112 even if the axis of head is tilted compared to the axis of the body, for example, if the person is turning his/her face up or down, or the like.

Figure 11:
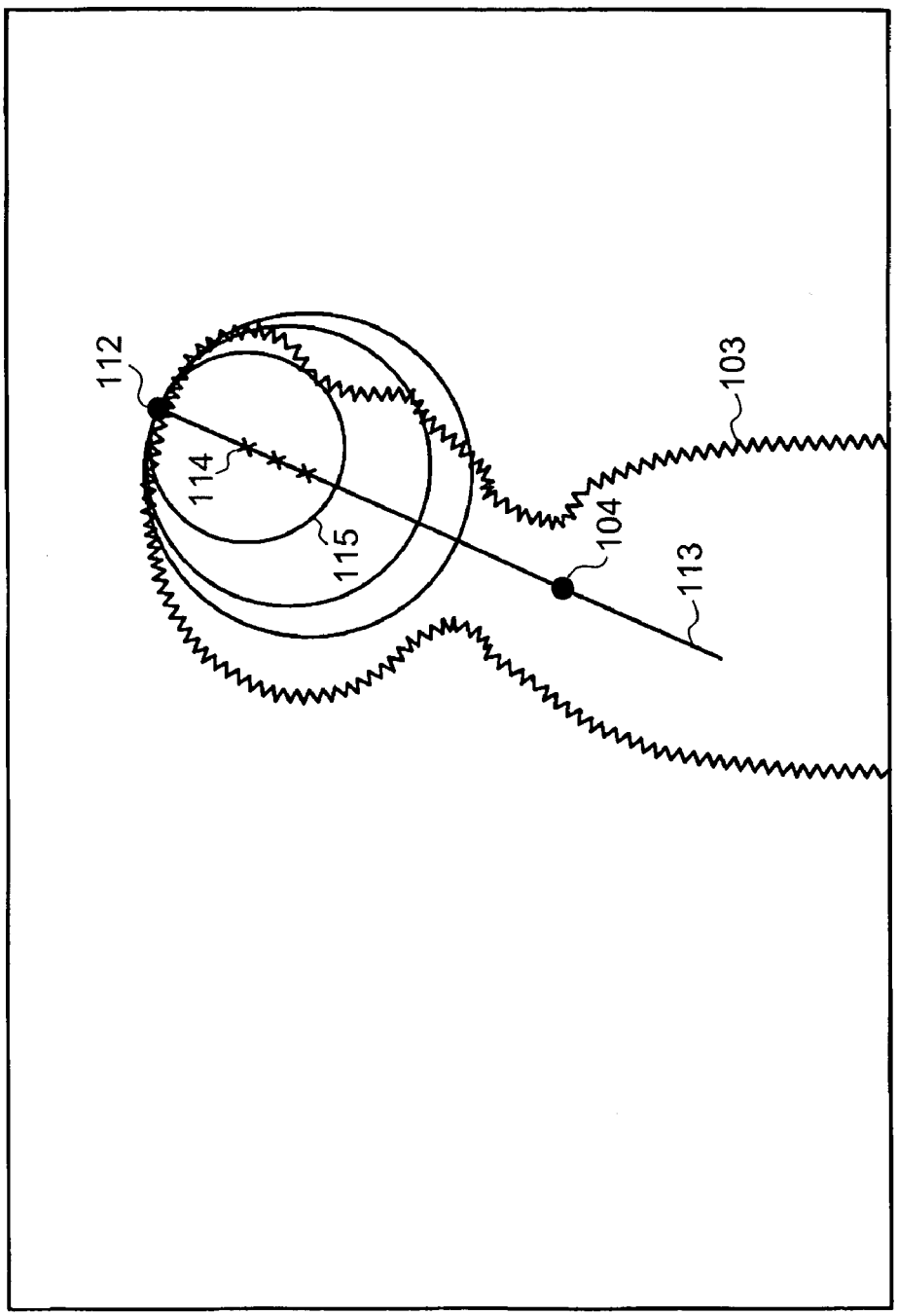
FIG. 11 shows an example of a circle 115 for determining the head region.

FIG. 11 shows an example of a circle 115 for determining the head region. The head computing section 24 calculates the proportion of the foreground region 103 in the circle 115 by gradually enlarging the circle 115, which passes through the top point of the head 112 and of which the center 114 is on the center line 113. The proportion of the foreground region in the circle 115 decreases as the circle 115 is enlarged. When the circle reaches to the biggest size which does not exceed a predetermined proportion, the head computing section 24 determines the circle 115 as a head area circle 116.

Figure 12:
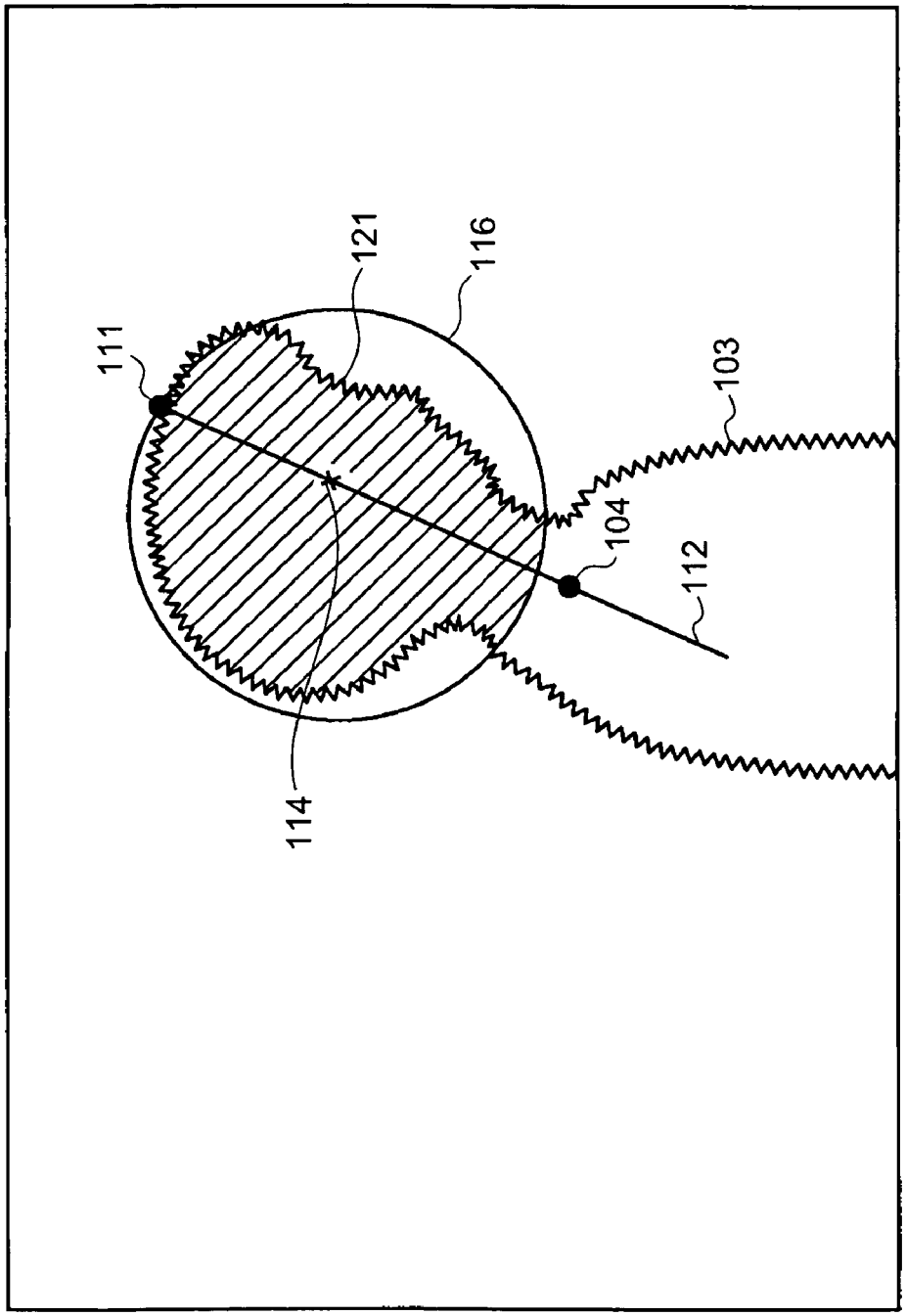
FIG. 12 shows an example of a head area circle 116 and a head region 121 which are determined.

FIG. 12 shows an example of the head area circle 116 and a head region 121 which are determined. The head computing section 24 sets a portion included in the head area circle 116 in the foreground region as the head region 121. Thus, the head computing section 24 can appropriately specify the portion which includes the head, from the foreground region 103 by using the head area circle 116.

Figure 13:
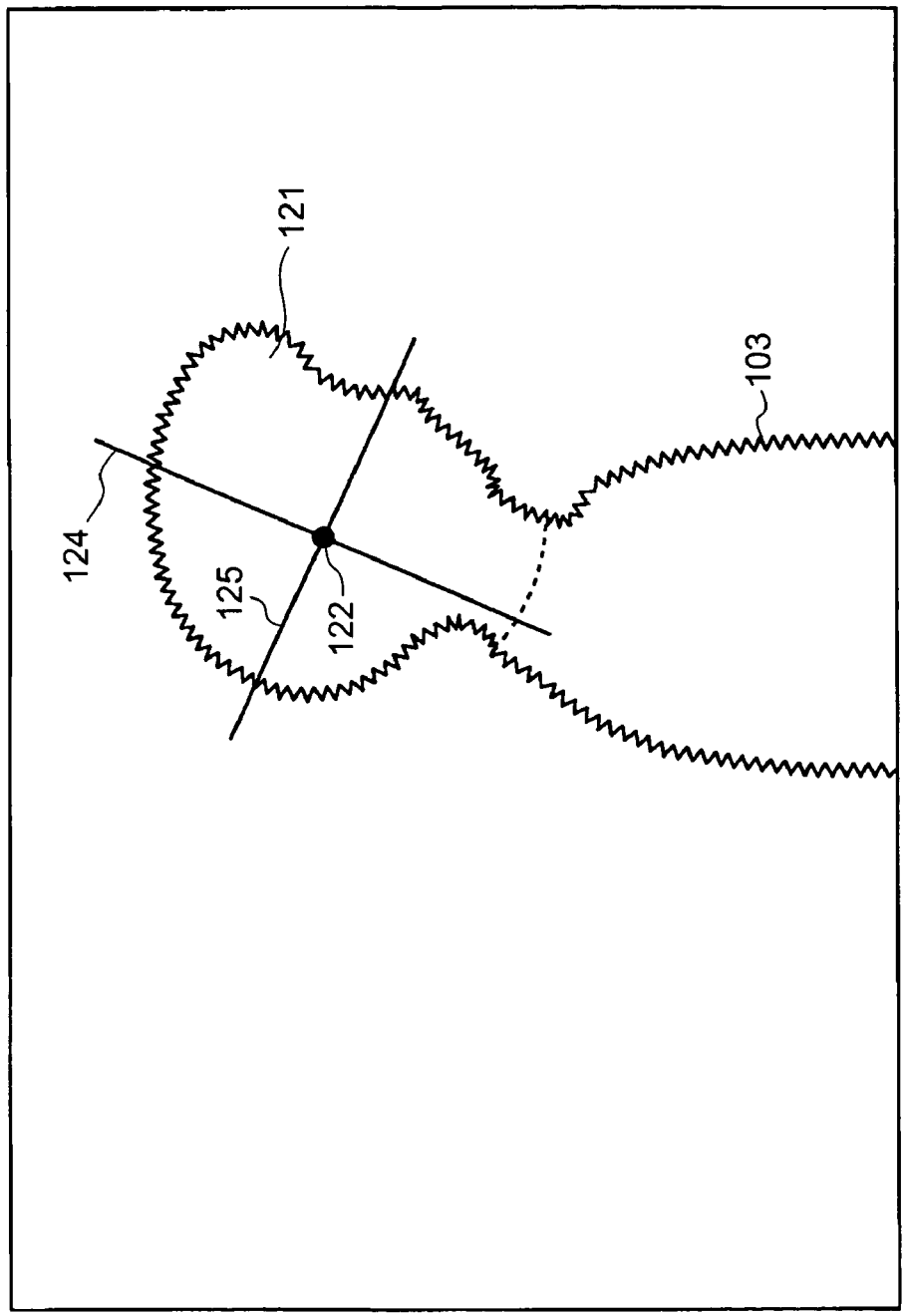
FIG. 13 shows an example of a center of ellipse 122, a long axis 124 and a short axis 125.

FIG. 13 shows an example of a center of ellipse 122, a long axis 124 and a short axis 125. The ellipse determining section 25 determines each parameter of the ellipse which is applied to the head. The ellipse determining section 25 calculates the center of gravity of the head region 121, and sets the calculated center of gravity as the center of ellipse 122. Furthermore, the ellipse determining section 25 calculates the main axis of the head region 121 based on the moment around the center of gravity of the head region 121. The ellipse determining section 25 sets the calculated main axis as the long axis 124 of the ellipse, and also sets the axis orthogonal to the main axis as the short axis 125.

Figure 14:
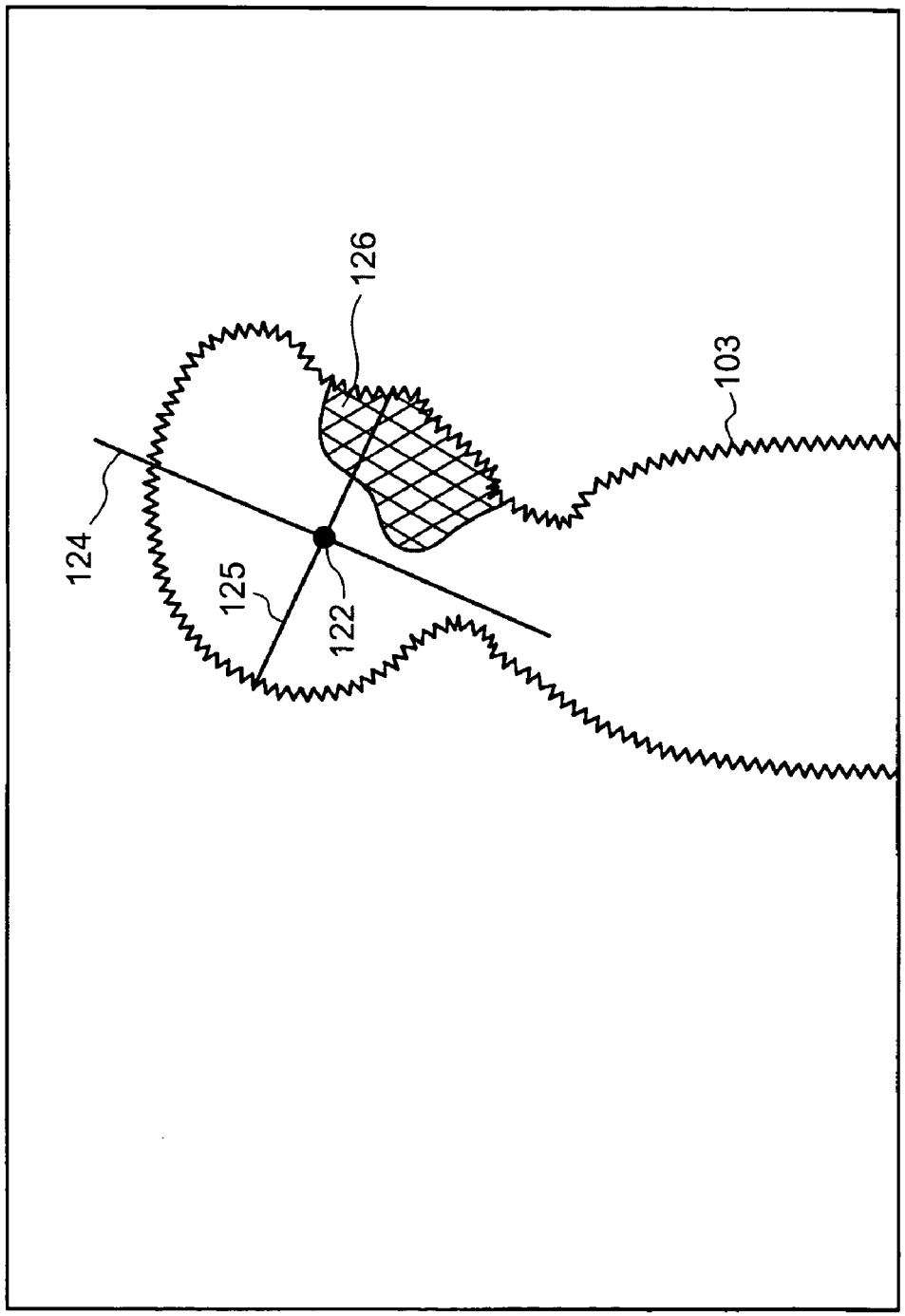
FIG. 14 shows an example of a method for determining a length of a short axis 125.

FIG. 14 shows an example of a method for determining the length of the short axis 125. After determining the angle of the long axis 124 and the short axis 125, the ellipse determining section 25 determines the length of the long axis 124 and the short axis 125. For example, the ellipse determining section 25 determines the length of the short axis 125 by extracting the face section 126, then determines the value obtained by multiplying the length of the short axis by a value which exceeds 1 (for example, 1.2, or the like) as the length of the long axis 124.

Figure 15:
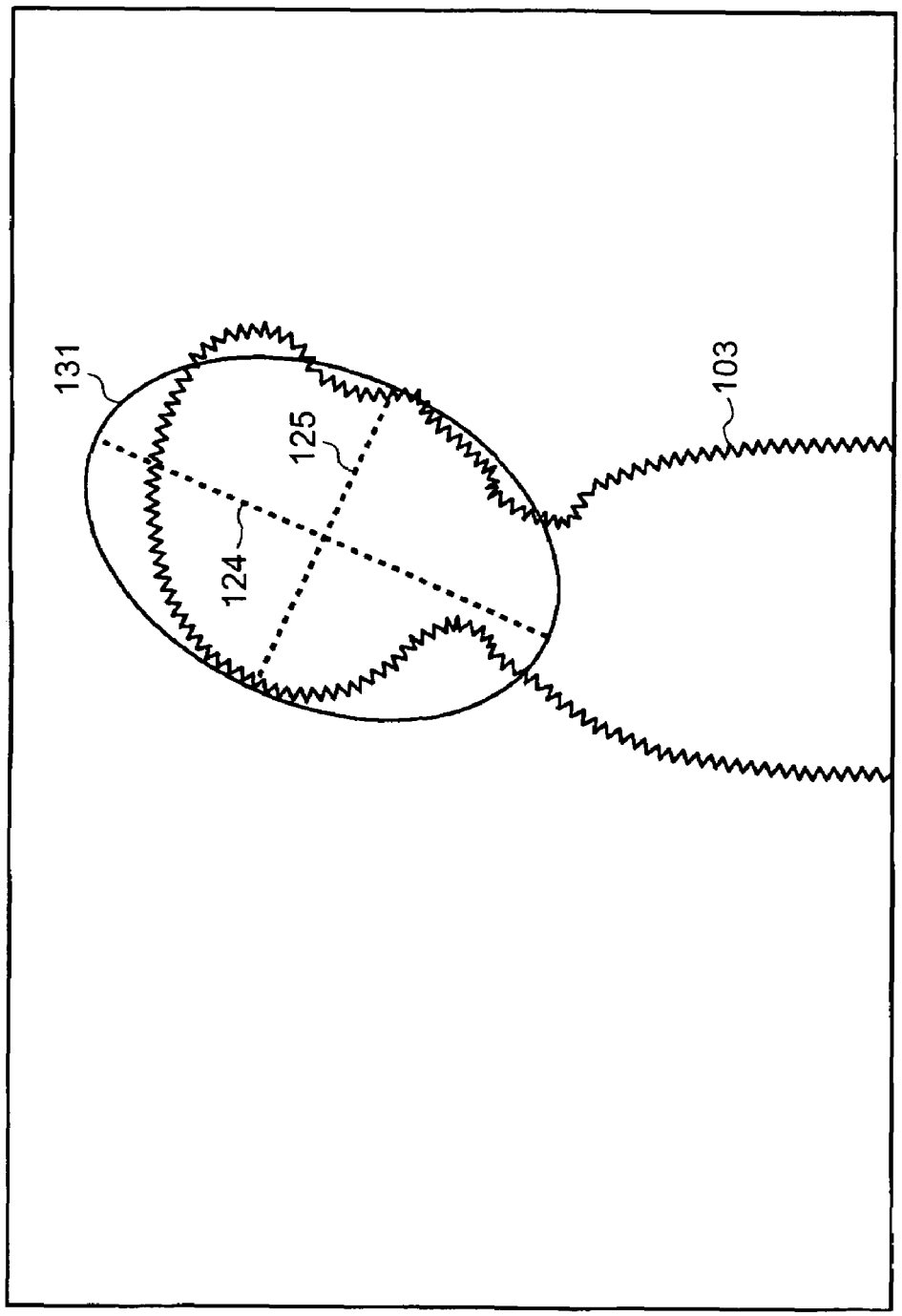
FIG. 15 shows an ellipse 131 applied to the head.

FIG. 15 shows an ellipse applied to the head. As described above, the ellipse determining section 25 can specify an ellipse 131 to be applied to the head of the image of a person 102 of the input image 101 by determining the center, the inclination of the long axis 124, and the length of the long axis 124 and the short axis 125. Thus, by applying the ellipse 131 to the head of the image of a person 102, it is possible to easily analyze the motion of the subject of the portrait image 102.

Figure 16:
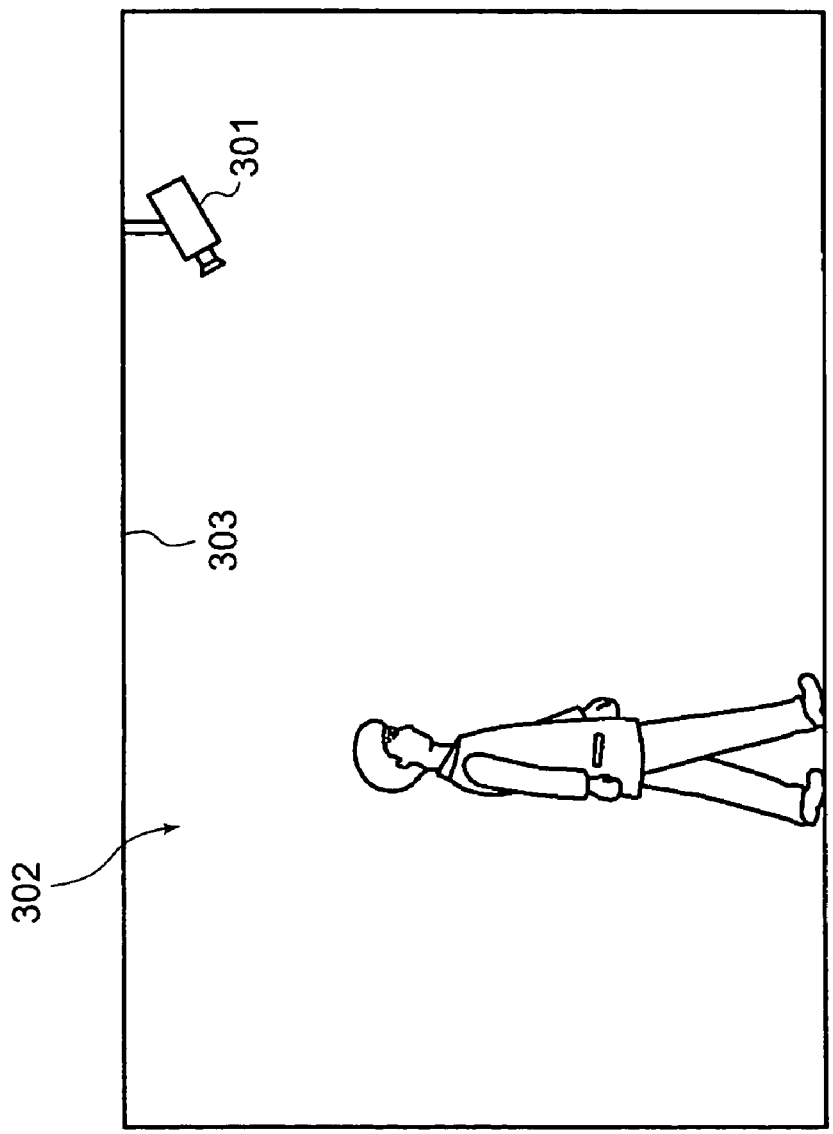
FIG. 16 shows a camera 301 installed on a ceiling 303.

FIG. 16 shows a camera 301 installed on a ceiling 303. The camera 301 shown in FIG. 16 faces obliquely downward in a store 302. For example, when an input image obtained by a camera such as the camera 301 is input, the detection section 26 can estimate the motion of a person as below.

When the detection section 26 detects the ellipse applied to the head moving to the left and/or right, the detection section 26 estimates that the person moved to the left and/or right from the viewpoint of the camera 301. When the detection section 26 detects the ellipse moving up and/or down, if the size of the ellipse changes, the detection section 26 estimates that the person moved between the back and/or front from the viewpoint of the camera 301, and if the size of the ellipse does not change, the detection section 26 estimates that the person moved up and/or down in three dimension space. If a foreground region which is estimated to be the whole body of a person is obtained, that is, if the foreground region is not abruptly cut at the edge of frame, the detection section 26 may estimate the person moved in the direction between the back and front in the frame of the foreground region, assuming that the person is not jumping.

Also, the detection section 26 may estimate rotation about the axis of the head (that is, shaking the head) from the change of the size of the area of the flesh color region in the ellipse. In this case, if the size of the area of the flesh color region increases, the detection section 26 estimates that the face is turned toward the camera 301, and if the size of the area of the flesh color region decreases, the detection section 26 estimates that the face is turned away from the camera 301 (turning the back of the head to the camera 301).

Furthermore, the detection section 26 may estimate that the axis of the head inclined (nodding the head or inclining the head obliquely) from the distribution of the flesh color region in the ellipse and the inclination of the main axis of the ellipse. For example, if the flesh color region distributes in the left side of the ellipse, the detection section 26 may estimate that the face of the person is turning to the left side. In this case, if the main axis of the ellipse inclines to the left side, the detection section 26 may estimate that the person's head is inclined. Also, if there is no difference of distribution of the flesh color region between the left side and the right side, the detection section 26 may estimate that the face of the person is facing straight to the camera 301, or the person is turning his back to the camera 301 (if there is no flesh color region). Also, if the main axis of the ellipse inclines, the detection section 26 may estimate that the head is also inclined to the same side.

For example, if a person frequently moves the head or turns the head up in the store worrying about the camera 301 or the other persons, which is an unusual motion of head not seen in the other customers, and which is detected by estimating the motion of the person based on the change of the ellipse, the detection section 26 can determine that the person is suspicious as described above. Incidentally, the shape to be applied to the head does not have to be an ellipse, and may be other shapes. The other shapes include, for example, a shape similar to the shape of a person's head in an input image, or a shape in which the vertical and horizontal direction can be recognized. In this case, the present embodiment estimates the motion of the head by applying the other shape to an input image.

Figure 17:
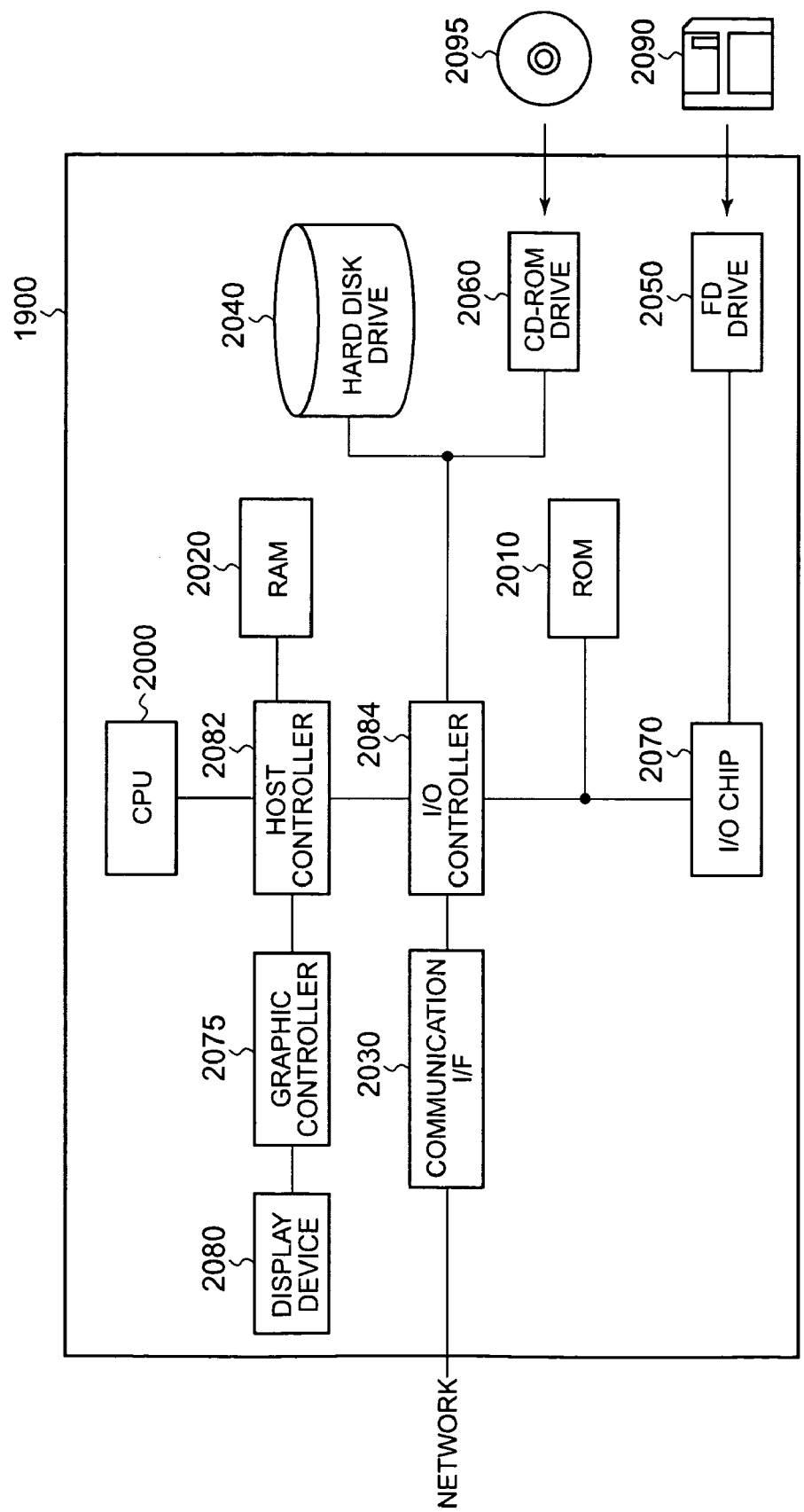
FIG. 17 shows an example of a hardware configuration of a computer 1900 according to the present invention.

FIG. 17 shows an example of a hardware configuration of a computer 1900 according to the present embodiment. The computer 1900 includes a CPU peripheral section having CPU 2000, a RAM 2020, a graphic controller 2075, and a display section 2080 mutually connected via a host controller 2082; an input/output section having a communication interface 2030, a hard disk drive 2040, and a CD-ROM drive 2060 connected to the host controller 2082 via an input/output controller 2084; and a legacy input-output section having a ROM 2010, a floppy disk drive 2050, and an input/output chip 2070 connected to the input/output controller 2084.

The host controller 2082 connects the RAM 2020 to the graphic controller 2075 and the CPU 2000 which accesses the RAM 2020 with a high transfer rate. The CPU 2000 operates based on a program stored in the ROM 2010 and the RAM 2020, and controls each part. The graphic controller 2075 acquires image data generated on a frame buffer provided in the RAM 2020 by the CPU 2000 and the like, and displays it on the display device 2080. Alternately, the graphic controller 2075 may include the frame buffer which stores the graphic data generated by the CPU 2000 and the like.

The input/output controller 2084 connects the host controller 2082 to the communication interface 2030, the hard disk drive 2040, and the CD-ROM drive 2060 which are relatively high-speed input/output devices. The communication interface 2030 communicates with other devices via a network. The hard disk drive 2040 stores a program and data used by the CPU 2000 in the computer 1900. The CD-ROM drive 2060 reads out programs or data from a CD-ROM 2095, and offers it to the hard disk drive 2040 via the RAM 2020.

Also, the input/output controller 2084 is connected to the ROM 2010, and relatively low-speed input/output devices such as the floppy disk drive 2050 and the input/output chip 2070. The ROM 2010 stores a boot program performed by the computer 1900 during the start up, a program which depends on the hardware of the computer 1900, and the like. The floppy disk drive 2050 reads out programs or data from a floppy disk 2090, and offers it to the hard disk drive 2040 via the RAM 2020. The input/output chip 2070 connects various input/output devices via the floppy disk drive 2050, or interfaces such as a parallel port, serial port, keyboard port, mouse port, and the like.

A program provided to the hard disk drive 204 via the RAM 2020 is stored in a recording medium such as the floppy disk 2090, a CD-ROM 2095, an IC card, or the like, and provided by the user. The program is read by the recording medium, installed in the hard disk drive 2040 in the computer 1900 via the RAM 2020, and performed in the CPU 2000.

The program which is installed in the computer 1900 and causes the computer 1900 to function as the monitoring system 10 includes an input module, a foreground extraction module, a first main axis calculation module, a head computing module, an ellipse determination module, a detection module, a storage module, and an abnormality detection module. These program or modules utilize the CPU 2000 and cause the computer 1900 to function as the input section 21, the foreground extraction section 22, the first main axis computing section 23, the head computing section 24, the ellipse determining section 25, the detection section 26, the storage section 27, and the abnormality detection section 28.

The program or modules described above may be stored in an external storage medium. As the storage medium, not only the floppy disk 2090, the CD-ROM 2095, but also an optical recording medium such as a DVD, a CD, an optical magnetic recording medium such as MO, and a semiconductor memory such as a tape medium, an IC card, and the like, may be used. Also, a storage device such as a hard disk or RAM provided in a server system connected to a dedicated communication network or the internet may be used as a recording medium in order to provide a program to the computer 1900 via a network.

Since the present invention is explained by using the embodiment described above, it should be noted here that the technical scope of the present invention is not limited to the above embodiment. For those skilled in the art, it is assumed that the various modifications and improvements may be included in the above embodiments. Also, from the scope of the claims, it is also assumed that those modifications and improvements to the embodiment of the invention may be included in the technical scope of the present invention.

The invention claimed is:

1. A head detecting method comprising the steps of:
   a foreground extracting step for extracting a foreground region, in which a person has been taken, from an input image;
   a first main axis computing step for computing a main axis of the foreground region, said first main axis computing step including a first moment computing step for computing a moment around a center of gravity of the foreground region, and calculating the main axis of the foreground region based on the moment around the center of gravity of the foreground region;
   a head region computing step for computing a head region included in the foreground region as a part thereof, based on the main axis of the foreground region and a shape of the foreground region;
   an ellipse determining step for determining an ellipse to be applied to the head of the person, based on a shape of the head region; and
   an input step for inputting a plurality of frame images constituting a moving image as a plurality of the input images;
   and wherein
   the first main axis computing step includes:
      a first orthogonal axes computing step for computing two orthogonal axes in the foreground region, based on the moment around the center of gravity of the foreground region; and
      a first main axis selection step for selecting one axis in the two orthogonal axes calculated by the first orthogonal axes computing step, which forms smaller angle with the main axis of the foreground region calculated in at least one of a previous frame and a next frame, as the main axis of the foreground region.

2. A head detecting method comprising:
   a foreground extracting step for extracting a foreground region, in which a person has been taken, from an input image;
   a first main axis computing step for computing a main axis of the foreground region;
   a head region computing step for computing a head region included in the foreground region as a part thereof, based on the main axis of the foreground region and a shape of the foreground region;
   an ellipse determining step for determining an ellipse to be applied to the head of the person, based on a shape of the head region;
   a search step for searching a top point of a head of a person, by setting a starting point at one of intersecting points of the outline of the foreground region and the main axis, which is deemed to be at a higher position in the image pick-up target space, and following pixels of the outline in the foreground region; and
   a circle computing step for computing a circle, in which the proportion of pixels of the foreground region included in the circle is equal to or greater than a predetermined reference proportion, as a circle surrounding the head, among circles which have centers on a line connecting the top point and the center of gravity of the foreground region and pass through the top point of the head;
   wherein the foreground region included in the circle surrounding the head is calculated as the head region.

3. The head detecting method, according to claim 2, wherein
   the search step follows an outline of the foreground region from the starting point in a direction away from the center of gravity of the foreground region, and sets a point where the distance from the center of gravity is maximum as the top point of the head.

4. The head detecting method, according to claim 2, wherein the search step determines the top point of the head under a condition that an angle formed by a central line which connects the top point of the head and the center of gravity of the foreground region, and the main axis of the foreground region is less than a predetermined reference amount of degree.

5. The head detecting method, according to claim 2, wherein:
   the search step determines the top point of the head under a condition that a length of the outline between the starting point and the top point of the head is equal to or less than a predetermined reference value.

6. The head detecting method, according to claim 2, wherein:
   the circle computing step corrects the circle surrounding the head to enlarge it so that the circle includes a whole flesh color region under a condition that the circle, surrounding the head calculated so that the proportion of pixels in the foreground region included in the circle is equal to or greater than a predetermined reference proportion, crosses the flesh color region of the foreground region.

7. A head detecting method comprising the steps of:
   a foreground extracting step for extracting a foreground region, in which a person has been taken, from an input image;
   a first main axis computing step for computing a main axis of the foreground region;
   a head region computing step for computing a head region included in the foreground region as a part thereof, based on the main axis of the foreground region and a shape of the foreground region; and
   an ellipse determining step for determining an ellipse to be applied to the head of the person, based on a shape of the head region, wherein
   the ellipse detection step includes a second principal computing step for computing a main axis of the head region, and determining the ellipse having the main axis as a long axis and wherein
   the second main axis computing step includes:
      a second moment computing step for computing a moment around a center of gravity of the head region;
      a second orthogonal axes computing step for computing two orthogonal axes in the head region based on the moment around the center of gravity of the head region; and
      a second main axis selection step for selecting an axis which forms smaller angle with the main axis of the foreground region, in the two orthogonal axes.

8. A head detecting method comprising the steps of:
   a foreground extracting step for extracting a foreground region, in which a person has been taken, from an input image;
   a first main axis computing step for computing a main axis of the foreground region;

a head region computing step for computing a head region included in the foreground region as a part thereof, based on the main axis of the foreground region and a shape of the foreground region; and an ellipse determining step for determining an ellipse to be applied to the head of the person, based on a shape of the head region, wherein:

the ellipse detection step includes a second principal computing step for computing a main axis of the head region, and determines the ellipse having the main axis as a long axis, a flesh color extraction step for extracting a biggest flesh color area in the head region; a short axis determination step for determining a length of the short axis according to a largest distance between the main axis of the head region and pixels in the flesh color area and a long axis determination step for setting a value obtained by multiplying the length of the short axis of the ellipse determined by the short axis determination step by a predetermined value which is larger than 1, as a length of a long axis of the ellipse.

9. A head detecting method comprising:

a foreground extracting step for extracting a foreground region, in which a person has been taken, from an input image;

a first main axis computing step for computing a main axis of the foreground region;

a head region computing step for computing a head region included in the foreground region as a part thereof, based on the main axis of the foreground region and a shape of the foreground region;

an ellipse determining step for determining an ellipse to be applied to the head of the person, based on a shape of the head region;

an input step for inputting a plurality of frame images constituting a moving image as a plurality of the input image; and a detection step for detecting a change of a position and an orientation of the person's head based on a change of the ellipse determined according to the plurality of frame images, wherein:

the input step inputs the plurality of the frame images constituting the moving image captured by the image pick-up device for a monitoring purpose;

and further including:

a storage step for storing history of the change of the position and the orientation of the person's head for each of a plurality of persons in a storage section; and an abnormality detection step for detecting an abnormal action of the person under a condition that a difference between an amount of the change of the position and the orientation of the person's head and a reference amount of change based on a position and a change of other person's head stored in the storage section is equal to or more than a predetermined amount.

* * * * *